(12) United States Patent
Jeong et al.

(10) Patent No.: US 10,124,700 B2
(45) Date of Patent: Nov. 13, 2018

(54) LOCKING DEVICE FOR FOLDABLE STRUCTURE

(71) Applicant: HYUNDAI DYMOS INCORPORATED, Seosan-si, Chungcheongnam-do (KR)

(72) Inventors: Seong Bin Jeong, Yongin-si (KR); Myung Jin Lee, Hwaseong-si (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 11 days.

(21) Appl. No.: 15/651,180

(22) Filed: Jul. 17, 2017

(65) Prior Publication Data

US 2018/0015852 A1    Jan. 18, 2018

(30) Foreign Application Priority Data

Jul. 18, 2016    (KR) .................. 10-2016-0090637

(51) Int. Cl.
| | |
|---|---|
| *B60N 2/30* | (2006.01) |
| *B60N 2/22* | (2006.01) |
| *B60N 2/20* | (2006.01) |
| *B60N 2/90* | (2018.01) |
| *B60N 2/00* | (2006.01) |

(52) U.S. Cl.
CPC .............. *B60N 2/22* (2013.01); *B60N 2/20* (2013.01); *B60N 2/919* (2018.02); *B60N 2/00* (2013.01)

(58) Field of Classification Search
CPC ........ B60N 2/305; B60N 2/36; B60N 2/3013; B60N 2/0837; B60N 2/20; B60N 2/22
See application file for complete search history.

(56) References Cited

U.S. PATENT DOCUMENTS

| | | | | |
|---|---|---|---|---|
| 3,059,964 | A * | 10/1962 | Makowski | B60N 2/3047 296/65.05 |
| 4,106,809 | A * | 8/1978 | Minka | B60N 2/3015 296/69 |
| 6,024,397 | A * | 2/2000 | Scraver | B60N 2/3013 296/65.05 |
| 6,435,589 | B2 * | 8/2002 | Shimizu | B60N 2/01583 296/65.05 |
| 6,637,819 | B2 * | 10/2003 | Tame | B60N 2/01583 296/65.08 |

(Continued)

FOREIGN PATENT DOCUMENTS

| | | |
|---|---|---|
| JP | H05-208634 A | 8/1993 |
| KR | 10-2001-0061864 A | 7/2001 |

(Continued)

*Primary Examiner* — Shin H Kim
(74) *Attorney, Agent, or Firm* — Brinks Gilson & Lione (57) ABSTRACT

Disclosed is a locking device for a foldable structure, and the locking device includes: a foldable body, a support bracket to support a rotation shaft of the foldable body, a locking pin elastically supported in a direction from the foldable body toward the support bracket, a locking groove provided in the support bracket such that the locking pin is seated therein to inhibit a rotation of the foldable body with respect to the support bracket, and an unlocking tool provided in the foldable body to provide a linear displacement of the locking pin while overcoming an elastically-biased force of the locking pin such that the locking pin is separated from the locking groove.

8 Claims, 7 Drawing Sheets

(56) References Cited

U.S. PATENT DOCUMENTS

| | | | | |
|---|---|---|---|---|
| 6,749,264 B2* | 6/2004 | Jeong | ............... | B60N 2/01583 248/503.1 |
| 7,152,900 B2* | 12/2006 | Trombley | ............ | B60N 2/0232 296/65.09 |
| 2002/0105215 A1* | 8/2002 | Ito | ............ | B60N 2/06 297/378.12 |
| 2005/0012373 A1* | 1/2005 | Fujita | ............ | B60N 2/3013 297/337 |
| 2005/0017564 A1* | 1/2005 | Kayumi | ............ | B60N 2/01583 297/378.1 |
| 2005/0062326 A1* | 3/2005 | Kim | ............ | B60N 2/01583 297/344.1 |
| 2006/0066144 A1* | 3/2006 | Tsujibayashi | ...... | B60N 2/01583 297/378.14 |
| 2006/0255637 A1* | 11/2006 | O'Connor | ............ | B60N 2/01583 297/331 |
| 2009/0243357 A1* | 10/2009 | Mori | ............ | B60N 2/30 297/325 |
| 2010/0026033 A1* | 2/2010 | Homier | ............ | B60N 2/3013 296/65.08 |
| 2010/0207421 A1* | 8/2010 | Sayama | ............ | B60N 2/3011 296/66 |
| 2010/0207422 A1* | 8/2010 | Sayama | ............ | B60N 2/01583 296/66 |
| 2011/0049953 A1* | 3/2011 | Champ | ............ | B60N 2/01583 297/326 |
| 2014/0015296 A1* | 1/2014 | Ogata | ............ | B60N 2/3013 297/340 |
| 2014/0049083 A1* | 2/2014 | Watanabe | ............ | B60N 2/3013 297/331 |
| 2015/0375646 A1* | 12/2015 | Lee | ............ | B60N 2/20 297/463.1 |
| 2018/0015849 A1* | 1/2018 | Mahadik | ............ | B60N 2/20 |
| 2018/0015852 A1* | 1/2018 | Jeong | ............ | B60N 2/919 |
| 2018/0213936 A1* | 8/2018 | Sasaki | ............ | B60N 2/2227 |

FOREIGN PATENT DOCUMENTS

| | | |
|---|---|---|
| KR | 10-2003-0033161 A | 5/2003 |
| KR | 10-2012-0120724 A | 11/2012 |
| KR | 10-1518644 B1 | 5/2015 |

* cited by examiner

FIG. 7A before operation

FIG. 7B pulling handle

FIG. 8A locking

FIG. 8B unlocking

LOCKING DEVICE FOR FOLDABLE STRUCTURE

CROSS REFERENCE TO RELATED APPLICATION

This application claims priority to and the benefit of Korean Patent Application No. 10-2016-0090637, filed on Jul. 18, 2016, which is incorporated herein by reference in its entirety.

FIELD

The present disclosure generally relates to a locking device for a foldable structure.

BACKGROUND

The statements in this section merely provide background information related to the present disclosure and may not constitute prior art.

Generally, a vehicle provides structures enabling components, such as a seat back, to be switched from a folded state to an unfolded state.

The structures may be in a form of a foldable structure which should be rotatably supported so that it can switch between folded and unfolded states. The foldable structure should allow the folded or unfolded states to be stably supported, and should be capable of switching to another state by releasing the supported state as needed.

The foregoing is intended merely to aid in the understanding of the background of the present disclosure, and is not intended to mean that the present disclosure falls within the purview of the related art that is already known to those skilled in the art.

SUMMARY

The present disclosure proposes a locking device for a foldable structure, in which with a relatively simple configuration and robust durability, a seat back-like structure mounted on the vehicle is supported to be able to smoothly switch between a folded state and an unfolded state, and it is possible to lock the unfolded state such that the unfolded state is stably maintained, and further, the locked state can be easily released to enable switching to the folded state.

In order to achieve the above object, according to one aspect of the present disclosure, a locking device for a foldable structure may include: a foldable body; a support bracket configured to support a rotation shaft of the foldable body; a locking pin elastically supported in a direction from the foldable body toward the support bracket; a locking groove provided in the support bracket such that the locking pin is seated therein to inhibit a rotation of the foldable body with respect to the support bracket; and an unlocking tool provided in the foldable body and configured to provide a linear displacement of the locking pin while overcoming an elastically-biased force of the locking pin such that the locking pin is separated from the locking groove.

The foldable body may be provided with a guide pin protruding toward the support bracket; and the support bracket may be integrally provided with a guide part configured to guide the guide pin to move while drawing an arc-shaped trace with respect to the support bracket during a relative rotation of the foldable body.

A hinge pin serving as a rotation shaft of the foldable body may be mounted to the support bracket; and the guide pin may be mounted to the foldable body at a location opposite to the locking pin based on the hinge pin.

The support bracket may be formed with a locking guide groove configured to receive a rotation trace of the locking pin at a location over the hinge pin; the locking groove may be formed at an end of the locking guide groove; the guide part of the support bracket may be defined by an arc-shaped outer surface of the support bracket formed with a constant radius from the hinge pin; and opposite ends of the arc-shaped outer surface of the support bracket may protrude radially outward from the arc-shaped outer surface to limit a rotational displacement of the guide pin. In one form, a depth of the locking groove is greater than a depth of the locking guide groove.

The locking pin may be slidable toward the support bracket by a guide bracket locked to the foldable body; and a locking spring may be provided between a flange of the locking pin and the guide bracket to elastically support the locking pin toward the support bracket.

The unlocking tool may include: a release cable connected to the locking pin; a release lever configured to pull or release the release cable by being rotated with respect to the foldable body; a release spring configured to elastically maintain a state where the release lever releases the release cable; and a handle connected to the release lever such that the locking pin is separated from the locking groove of the support bracket by pulling the release lever configured to pull the release cable.

The foldable body may be in a form of a vehicle seat back; an unfolded state of the foldable body may be a state where the vehicle seat back is unfolded upward, wherein the locking pin may be seated in the locking groove to hold the state where the vehicle seat back is unfolded upward; and a folded state of the foldable body may be a state where the vehicle seat back is rotated downward, wherein the folded state may be stably maintained by self weight of the vehicle seat back.

According to an exemplary form of the present disclosure, the present disclosure is advantageous in that, with a relatively simple configuration and robust durability, a seat back-like structure mounted on the vehicle is supported to be able to smoothly switch between a folded state and an unfolded state, and it is possible to lock the unfolded state such that the unfolded state is stably maintained, and further, the locked state can be easily released to enable switching to the folded state.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Hereinbelow, an exemplary form of the present disclosure will be described in detail with reference to the accompanying drawings. However, the following description is merely exemplary in nature and is not intended to limit the present disclosure, application, or uses. For reference, the same reference numerals in this description refer to substantially the same elements and can be described with reference to the contents described in the other drawings under these rules, and the contents that are judged to be obvious to those skilled in the art or repeated may be omitted.

Referring to FIGS. 1 to 6, a locking device for a foldable structure in one form of the present disclosure includes: a foldable body 1; a support bracket 3 configured to support a rotation shaft of the foldable body 1; a locking pin 5 elastically supported in a direction from the foldable body 1 toward the support bracket 3; a locking groove 7 provided in the support bracket 3 such that the locking pin 5 is seated therein to inhibit or prevent a rotation of the foldable body 1 with respect to the support bracket 3; and an unlocking tool provided in the foldable body 1 to provide a linear displacement of the locking pin while overcoming an elastically-biased force of the locking pin 5 such that the locking pin 5 is separated from the locking groove 7.

Figure 3:
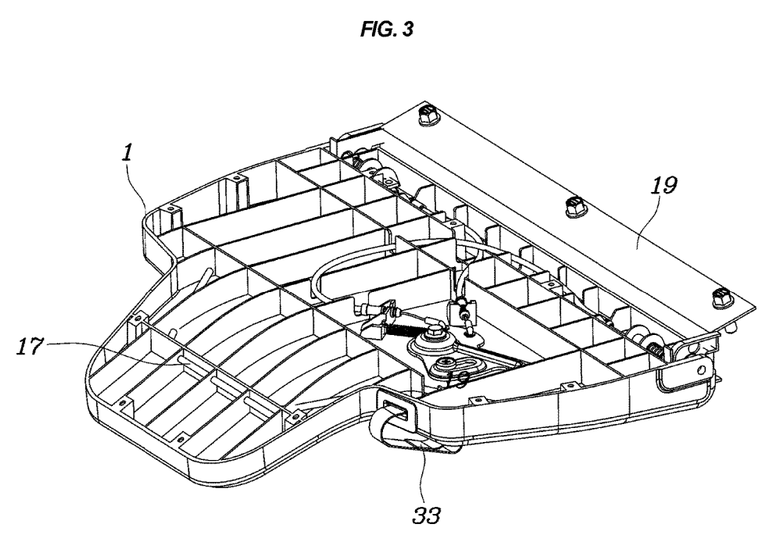
FIG. 3 is a view showing a state where a foldable body is folded seen from the opposite side to FIG. 1.
Figure 4:
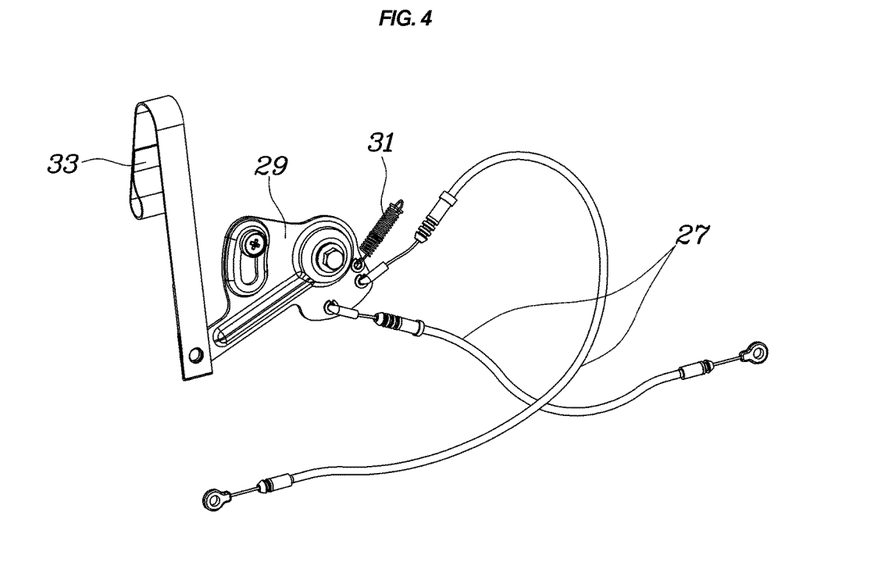
FIG. 4 is a detailed view partially showing an unlocking tool provided in a foldable body of FIG. 1.
Figure 5:
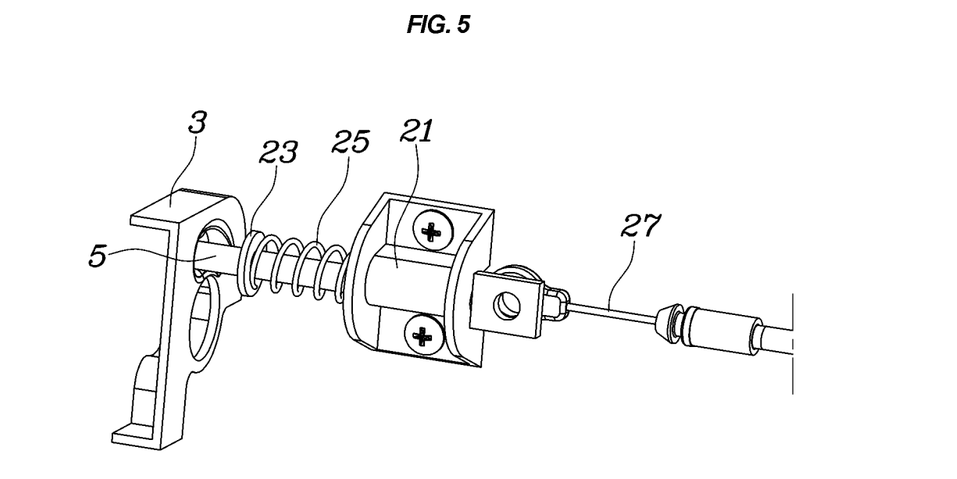
FIG. 5 is a detailed view showing a state where a locking pin is provided and a support bracket of FIG. 2

In other words, the present disclosure is configured such that the locking pin 5 is separated from the locking groove 7 of the support bracket 3 by using the unlocking tool so as to unlock the locked state, then the foldable body 1 is rotated to be folded as shown in FIG. 3, and the foldable body 1 is rotated to be unfolded from the folded state such that the locking pin 5 is seated in the locking groove 7, thereby securely maintaining the unlocked state of the foldable body 1.

The foldable body 1 is provided with a guide pin 9 protruding toward the support bracket 3; and the support bracket 3 is integrally provided with a guide part 11 to guide the guide pin 9 to move while drawing an arc-shaped trace with respect to the support bracket 3 during a relative rotation of the foldable body 1.

In this form, a hinge pin 13 that serves as a rotation shaft of the foldable body 1 is mounted to the support bracket 3 and supported thereby, the guide pin 9 is mounted to the foldable body 1 at a location opposite to the locking pin 5 based on the hinge pin 13.

Figure 6:
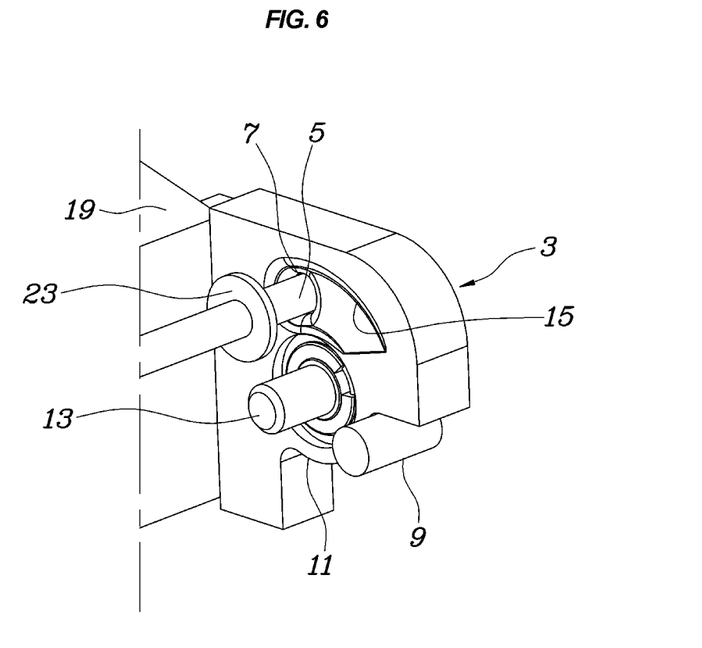
FIG. 6 is a detailed view showing a state where the support bracket, the locking pin, a guide pin, and a hinge pin are provided.
Figure 7A:
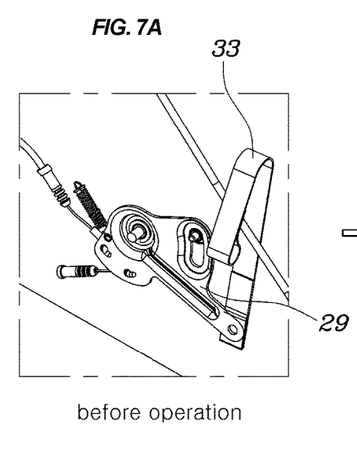
FIGS. 7A-7B are views showing comparison before and after operation of the unlocking tool.
Figure 7B:
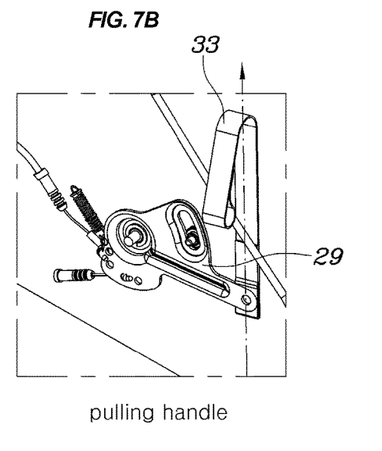
Figure 8A:
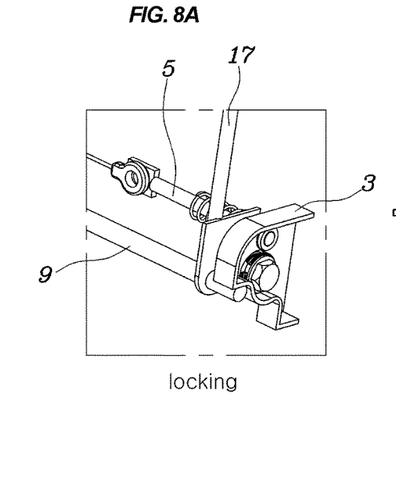
FIGS. 8A-8B are views showing comparison locked state and unlocked state of the locking pin in response to before and after operation of the unlocking tool of FIG. 7.
Figure 8B:
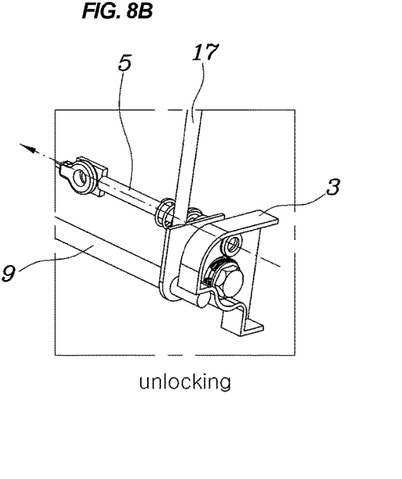

The support bracket 3 is formed with a locking guide groove 15 for receiving a rotation trace of the locking pin 5 at a location over the hinge pin 13; the locking groove 7 is formed at an end of the locking guide groove 15 to be deeper; the guide part 11 of the support bracket 3 is defined by an arc-shaped outer surface of the support bracket 3 formed with a constant radius from the hinge pin; and as shown in FIG. 6, opposite ends of the arc-shaped outer surface of the support bracket 3 protrude radially outward from the arc-shaped outer surface to limit a rotational displacement of the guide pin 9.

Accordingly, when the foldable body 1 is rotated, substantially, the rotation of the foldable body 1 is guided not only by the guide pin 9 and the guide part 11, but also by the locking pin 5 and the locking guide groove 15. In other words, although the locked state is released, the locking pin 5 is maintained in a state of being seated in the locking guide groove 15, thereby functioning to guide the rotation of the foldable body 1 by the locking guide groove 15 when the foldable body 1 is folded and unfolded, and the locking pin is seated in the locking groove 7 at a location of the locking groove 7, thereby forming the locked state.

Figure 2:
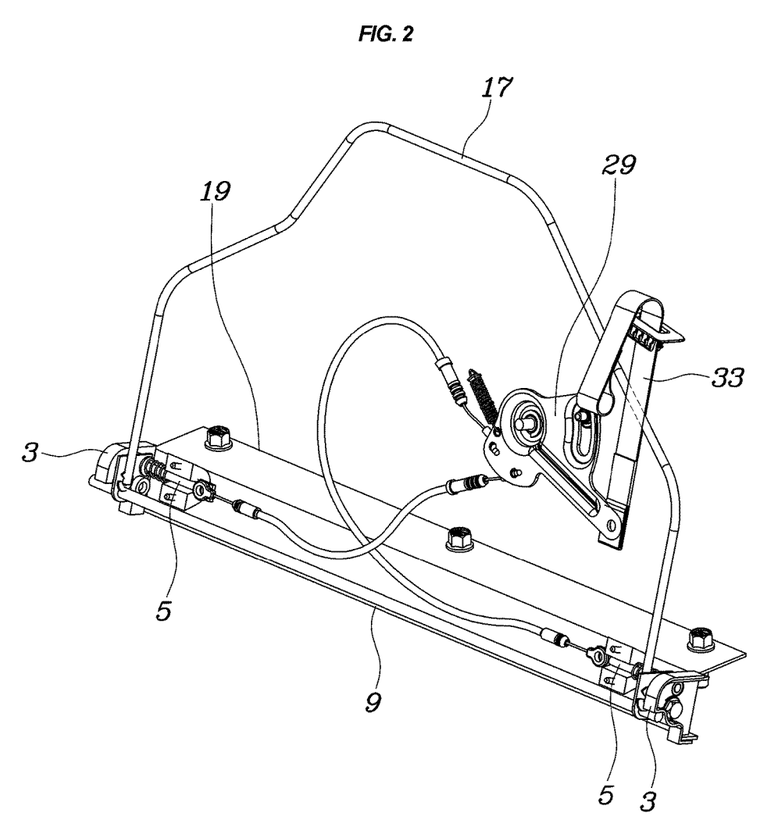
FIG. 2 is a view showing components of the present disclosure seen from an opposite side to FIG. 1.

For reference, in FIG. 2, the guide pin 9 is formed in a bar shape protruding toward opposite sides of the foldable body 1, a frame bar 17 that serves as a frame of the foldable body 1 is integrally coupled to opposite ends of the guide pin 9, and the support bracket 3 is provided at each of opposite ends of a vehicle body plate 19 to rotatably support the foldable body 1 at the opposite ends thereof.

The locking pin 5 is slidable toward the support bracket 3 by a guide bracket 21 locked to the foldable body 1, and a locking spring 25 is provided between a flange 23 of the locking pin 5 and the guide bracket 21 to elastically support the locking pin 5 toward the support bracket 3.

Further, in one form, the unlocking tool includes: a release cable 27 connected to the locking pin 5; a release lever 29 configured to pull or release the release cable 27 by being rotated with respect to the foldable body 1; a release spring 31 configured to elastically maintain a state where the release lever 29 releases the release cable 27; and a handle 33 connected to the release lever 29 such that the locking pin 5 is separated from the locking groove 7 of the support bracket 3 by pulling the release lever 29 to pull the release cable 27.

In another form, the handle 33 may be in the form of a strap. Accordingly, when the strap is pulled, the release lever 29 is rotated upward to pull the release cable 27, and displacement of the release cable 27 pulls the locking pin 5 such that the locking pin 5 is separated from the locking groove 7, whereby the foldable body 1 becomes ready to be folded.

Of course, if the foldable body 1 is rotated to be in the unfolded state from the folded state, the locking pin 5 is seated in the locking groove 7 at the location of the locking groove 7 by the elastic force of the locking spring 25 while moving along the locking guide groove 15, whereby the unfolded state of the foldable body 1 can be stably maintained.

Figure 1:
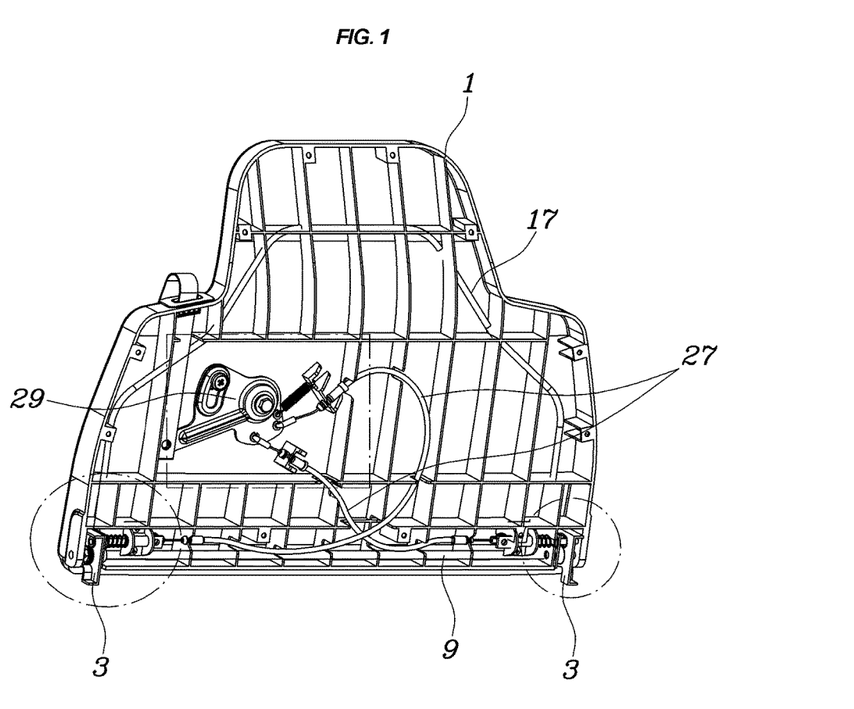
FIG. 1 is a view showing a locking device for a foldable structure in one form of the present disclosure.

In one form, the foldable body 1 may be in a form of a vehicle seat back, and as shown in FIG. 1, the unfolded state of the foldable body 1 may be a state where the seat back is unfolded upward, wherein the locking pin 5 may be seated in the locking groove 7 to hold the state where the seat back is unfolded upward; and as shown in FIG. 3, the folded state of the foldable body 1 may be a state where the seat back is rotated downward, and wherein the folded state may be stably maintained by self-weight of the seat back.

Although exemplary forms of the present disclosure have been described for illustrative purposes, those skilled in the art will appreciate that various modifications, additions and substitutions are possible, without departing from the scope and spirit of the present disclosure.

What is claimed is:

1. A locking device for a foldable structure, the locking device comprising:

a foldable body;

a support bracket configured to support a rotation shaft of the foldable body;

a locking pin elastically supported in a direction from the foldable body toward the support bracket;

a locking groove provided in the support bracket such that the locking pin is seated therein to inhibit a rotation of the foldable body with respect to the support bracket; and an unlocking tool provided in the foldable body and configured to provide a linear displacement of the locking pin while overcoming an elastically-biased force of the locking pin such that the locking pin is separated from the locking groove.

2. The locking device of claim 1, wherein the foldable body is provided with a guide pin protruding toward the support bracket; and the support bracket is integrally provided with a guide part configured to guide the guide pin to move while drawing an arc-shaped trace with respect to the support bracket during a relative rotation of the foldable body.

3. The locking device of claim 2, wherein a hinge pin serving as a rotation shaft of the foldable body is mounted to the support bracket; and the guide pin is mounted to the foldable body at a location opposite to the locking pin based on the hinge pin.

4. The locking device of claim 3, wherein the support bracket is formed with a locking guide groove configured to receive a rotation trace of the locking pin at a location over the hinge pin;

the locking groove is formed at an end of the locking guide groove;

the guide part of the support bracket is defined by an arc-shaped outer surface of the support bracket formed with a constant radius from the hinge pin; and opposite ends of the arc-shaped outer surface of the support bracket protrude radially outward from the arc-shaped outer surface to limit a rotational displacement of the guide pin.

5. The locking device of claim 4, wherein a depth of the locking groove is greater than a depth of the locking guide groove.

6. The locking device of claim 1, wherein the locking pin is slidable toward the support bracket by a guide bracket locked to the foldable body; and a locking spring is provided between a flange of the locking pin and the guide bracket, the locking spring configured to elastically support the locking pin toward the support bracket.

7. The locking device of claim 1, wherein the unlocking tool includes:

a release cable connected to the locking pin;

a release lever configured to pull or release the release cable by being rotated with respect to the foldable body;

a release spring configured to elastically maintain a state where the release lever releases the release cable; and a handle connected to the release lever such that the locking pin is separated from the locking groove of the support bracket by pulling the release lever configured to pull the release cable.

8. The locking device of claim 1, wherein the foldable body is in a form of a vehicle seat back;

an unfolded state of the foldable body is a state where the vehicle seat back is unfolded upward, wherein the locking pin is seated in the locking groove to hold the state where the vehicle seat back is unfolded upward; and a folded state of the foldable body is a state where the vehicle seat back is rotated downward, wherein the folded state is stably maintained by self weight of the vehicle seat back.

* * * * *